United States Patent [19]
Dominguez

[11] Patent Number: 5,588,788
[45] Date of Patent: Dec. 31, 1996

[54] DOUBLE HEADED FASTENER

[76] Inventor: Armando Dominguez, 2471 W. 65th St., Hialeah, Fla. 33016

[21] Appl. No.: 271,618

[22] Filed: Jul. 7, 1994

[51] Int. Cl.⁶ .............................. F16B 15/02; H02G 3/08
[52] U.S. Cl. ............................ 411/482; 411/923; 220/3.4
[58] Field of Search .................................. 411/480, 482, 411/923, 437; 220/3.3, 3.4, 3.9

[56] References Cited

U.S. PATENT DOCUMENTS

| | | | |
|---|---|---|---|
| 2,633,263 | 3/1953 | Stonaker | 220/3.4 |
| 2,652,168 | 9/1953 | Nelson et al. | 220/3.4 |
| 2,874,603 | 2/1959 | Boettcher | 411/482 |
| 2,917,917 | 12/1959 | Atkinson | 220/3.4 X |
| 3,096,680 | 7/1963 | Dudgeon | 441/480 |
| 5,057,649 | 10/1991 | Ring | 411/437 X |

FOREIGN PATENT DOCUMENTS 5153711  6/1993  Japan ..................... 220/3.4

*Primary Examiner*—Neill R. Wilson
*Attorney, Agent, or Firm*—J. Sanchelima

[57] ABSTRACT

An improved nail member having first and second heads on a shaft with two ends. One of the ends being defined by the first head and the other end has a pointed termination. A weakened portion is positioned between the second head and the pointed end, substantially closer to the second head. The weakened portion permits a user to readily break off most of the shaft including the pointed end. When the nail member is passed through an opening in an electrical box it keeps it in place while at the same time permits ready detachment of the shaft.

4 Claims, 2 Drawing Sheets

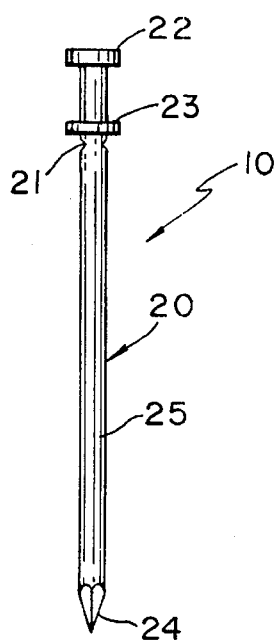
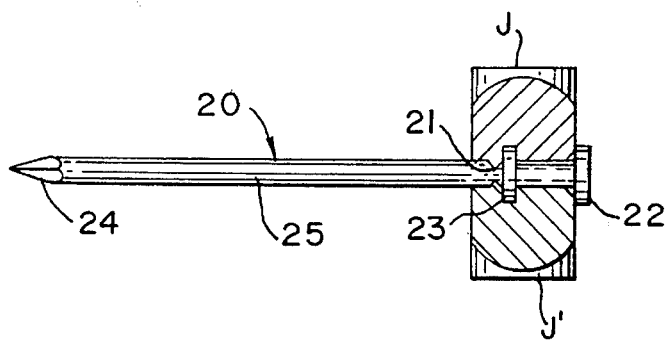
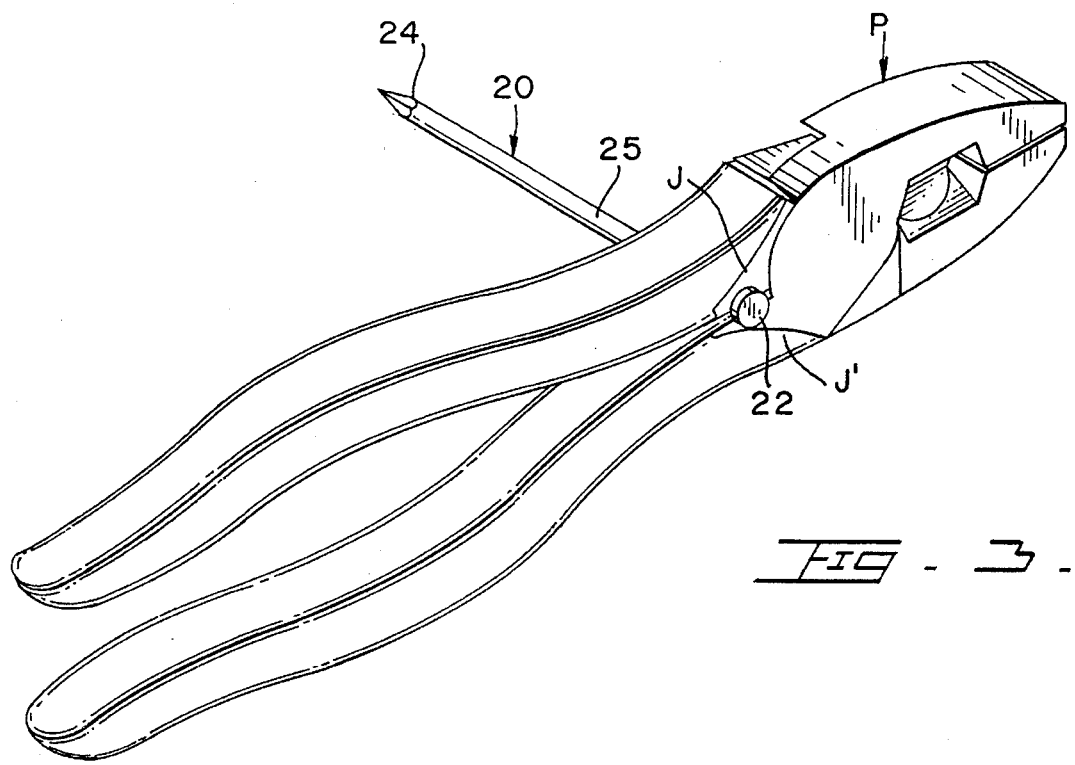

DOUBLE HEADED FASTENER

BACKGROUND OF THE INVENTION

1. Field of the Invention

The present invention relates to double headed nails and more particularly, to such double headed nails that include a weakened portion for its ready removal from the interior of electrical boxes when used to temporarily support the latter.

2. Description of the Related Art

Double headed nails have been used in a number of applications in the past, specially in the construction industry. Basically, double headed nails permit a user to fasten it to a given article while at the same time the outer head permits the ready removal of the nail. However, these nails cannot be used to support hollow electrical boxes because they would end up in the way. With the improved nail subject of the present invention, a user can remove the pointed end of the nail from within an electrical box after pouring the concrete that covers it completely.

SUMMARY OF THE INVENTION

It is one of the primary objects of the present invention to provide an improved double headed nail that is weakened just below its head to permit its ready detachment from the shank.

It is another object this invention to provide a tool for manufacturing the a nail with a weakened portion below its head. This is particularly useful for the installation of electrical boxes within a concrete slab when its being poured.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational view of the article of manufacture incorporating the features of the present invention.

FIG. 2 shows the article of FIG. 1 with a cross-sectional view of the jaws of a crimping tool.

FIG. 3 is an isometric view of the crimping tool.

DETAILED DESCRIPTION OF THE PREFERRED EMBODIMENT

Figure 4:
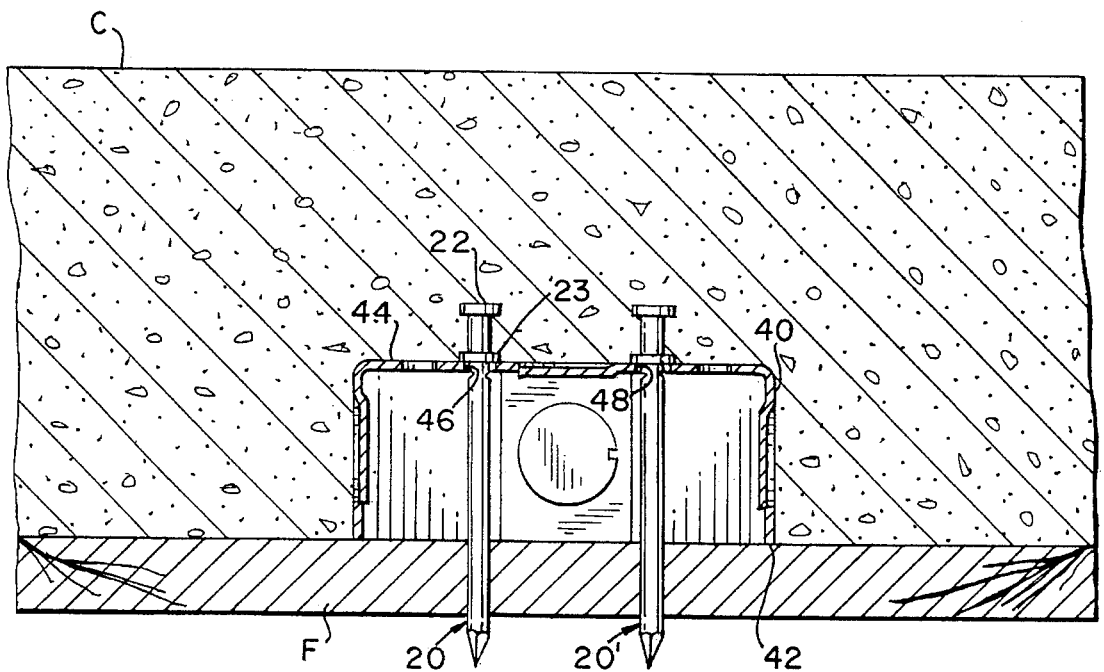
FIG. 4 is a cross-sectional elevational view of an electrical box mounted to a forming board over which a concrete slab was poured.

Referring now to FIG. 1, where the present invention is generally referred to with numeral 10, it can be observed that it basically consists of a nail member 20 with shaft 25 first head 22, second head 23 and pointed end 24. Weakened or reduced section 21 is located in the preferred embodiment, adjacent to second head 23 and away from head 22.

It can be seen in FIGS. 2 and 3 that one simple way of making nail member 20. A conventional double headed nail member can be weakened by reducing the diameter of a section of its shaft at a location between second head 23 and pointed end 24. The location is separated a predetermined distance, in the preferred embodiment, from second head 23. This can be accomplished using plyer tool P with customized jaws to crimp or make a cut that weakens the shaft 25 at location 21. It is also possible to achieve the weakening at location 21 through means other than reducing the thickness of shaft 25. These means include changing the composition of shaft 25 at 21 or through other production compatible means.

Nails member 20 and 20' is used, in one of its applications in conjunction with electrical box 40, as shown in FIG. 4. When pouring a concrete ceiling C over wooden forms F, electrical boxes 40 are positioned at different places so that its open end 42 rests on form F. Back wall 44 includes openings 46 and 48 through which nail members 20 and 20' are inserted.

After the concrete slab dries, forms F are removed. The electrician then only has to move shaft 25 of nail members 20 and 20' removing them from the interior of electrical box 40. At the present, a electrician has to improvise using wires and other time consuming means to affix electrical box 40 to a given position. Not infrequently, electrical boxes 40 moves with the consequent adverse effect of having misplaced electrical boxes.

Figure 5:
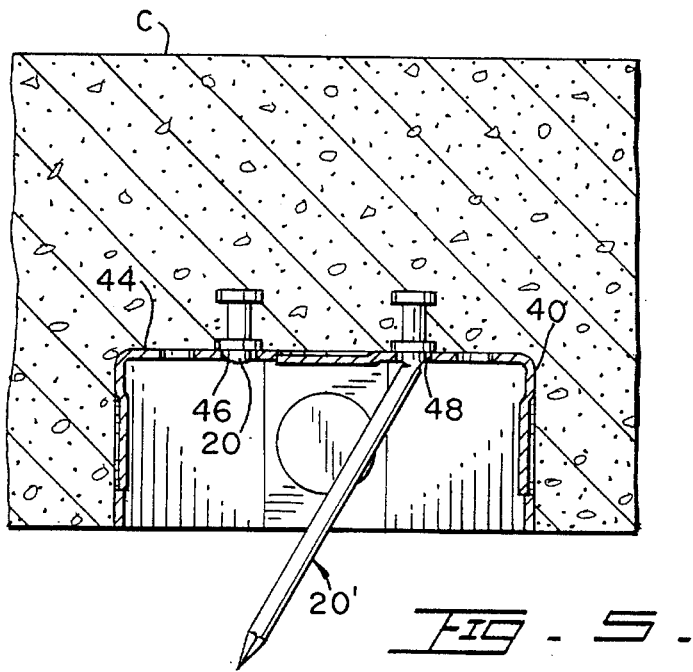
FIG. 5 is similar to FIG. 4 and illustrates a broken nail inside the electrical box and another nail that is in the process of being detached.

As shown in FIG. 5, the shank of nail 20 was readily detached allowing the use of the interior of electrical box 40.

Figure 6:
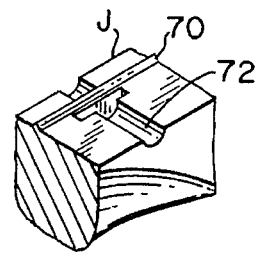
FIG. 6 is a partial detail of one of the jaws showing its crimping feature.

A partial view of jaw J is shown in FIG. 6. Crimping element 70 is shown and cavity 72 cooperatively receives one of the heads. Element 70, in the preferred embodiment, is positioned so that a section adjacent to the second head is weakened when a user applies pressure to the tool bringing jaws J and J' together. Other production methods for weakening a portion 21 of shaft 25 can also be utilized.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An elongated nail member including a shaft, having two ends, and said elongated nail member further including first and second heads and said first head defining one end of said nail member and said second head being positioned along said shaft at a spaced apart relationship with respect to said first head and on said shaft and the other end of said shaft having a pointed termination, the improvement comprising a weakened portion on said shaft located at a position separated a predetermined distance from said second head and opposite to said first head.

2. The improvement set forth in claim 1 wherein said weakened portion includes a section of said shaft with a reduced thickness.

3. An electric box, comprising:
A. housing means defining a cavity therein and said housing means includes a back wall having at least one hole and peripheral wall perpendicularly extending and defining a open end for said housing means; and
B. at least one nail member having a shaft with two ends, and one end having a head and the other end having a pointed termination, and said shaft includes a second head separated from said first head a predetermined distance and said shaft further includes a weakened portion at a position between said second head and said pointed end, and said nail member is inserted through said hole and protrudes through said open end thereby providing sufficient fastening ability to keep said electrical box in place.

4. The electrical box set forth in claim 3 wherein said weakened portion includes a section on said shaft with reduced thickness.

* * * * *